United States Patent
Roth

(10) Patent No.: US 9,830,486 B2
(45) Date of Patent: Nov. 28, 2017

(54) RFID VARIABLE APERTURE READ CHAMBER CROSSFIRE

(71) Applicant: Avery Dennison Corporation, Mentor, OH (US)

(72) Inventor: Mark W. Roth, North Miami, FL (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/584,518

(22) Filed: Dec. 29, 2014

(65) Prior Publication Data

US 2015/0353292 A1    Dec. 10, 2015

Related U.S. Application Data

(60) Provisional application No. 62/008,334, filed on Jun. 5, 2014.

(51) Int. Cl.
    *G06K 7/10*     (2006.01)
    *H01Q 17/00*    (2006.01)
    *B65G 43/00*    (2006.01)

(52) U.S. Cl.
    CPC ......... *G06K 7/10435* (2013.01); *B65G 43/00* (2013.01); *G06K 7/10425* (2013.01); *G06K 7/10445* (2013.01); *H01Q 17/00* (2013.01)

(58) Field of Classification Search
    CPC ........... G06K 7/10435; G06K 7/10445; G06K 7/10425
    See application file for complete search history.

(56) References Cited

U.S. PATENT DOCUMENTS

| 3,693,079 A | * | 9/1972 | Walker ............... G01N 22/04 250/250 |
| 3,849,633 A | * | 11/1974 | Reitboeck ............. B07C 3/12 209/3.3 |

(Continued)

FOREIGN PATENT DOCUMENTS

| CN | 100573545 | 12/2009 |
| CN | 102424228 | 4/2012 |

(Continued)

OTHER PUBLICATIONS

Fraunhofer IFF: "RFID Tunnel Gates for Reliable Bulk Reading", Retrieved from the internet: http://www.iff.fraunhofer.de/content/dam/iff/en/documents/publications/rfid-tunnel-gates-for-reliable-bulk-reading-fraunhofer-iff.pdf [retrieved on Mar. 5, 2014].

*Primary Examiner* — Thomas Randazzo
(74) *Attorney, Agent, or Firm* — Avery Dennison Retail Information Services, LLC

(57) ABSTRACT

A read chamber device disclosed for use within a radio frequency identification (RFID) scanning enclosure which provides a means of reading a plurality of cartons moving through the enclosure via a conveyor belt. The enclosure is positioned over a section of the conveyor belt, such that the plurality of cartons on the conveyor belt pass directly through the enclosure. The read chamber device that may be positioned centrally to the enclosure and projects a read zone via an antenna positioned centrally within the read chamber device. The read chamber device provides for tuning the read zone via a movable metal plate comprising absorber material secured to it, that is positioned at variable distances to partially or fully cover the read zone. The metal plate is moved into the read zone to obstruct a percentage of radio frequency energy from escaping the read zone, and thus narrowing the total read field.

15 Claims, 3 Drawing Sheets

(56) References Cited

U.S. PATENT DOCUMENTS

| | | | |
|---|---|---|---|
| 3,994,505 A | 11/1976 | Balha | |
| 4,350,883 A * | 9/1982 | Lagarde | G06K 1/12 235/435 |
| 5,041,826 A | 8/1991 | Milheiser | |
| 5,196,682 A | 3/1993 | Englehardt | |
| 5,310,784 A * | 5/1994 | Ide | H05K 9/0083 250/505.1 |
| 5,689,239 A * | 11/1997 | Turner | G06K 7/082 235/383 |
| 5,729,697 A | 3/1998 | Schkolnick et al. | |
| 5,815,252 A | 9/1998 | Price-Francis | |
| 6,107,921 A | 8/2000 | Eberhardt et al. | |
| 6,145,742 A | 11/2000 | Drexler | |
| 6,218,942 B1 * | 4/2001 | Vega | G06K 7/0008 340/572.1 |
| 6,371,375 B1 | 4/2002 | Ackley et al. | |
| 6,435,407 B1 | 8/2002 | Fiordelisi | |
| 6,949,951 B1 | 9/2005 | Young et al. | |
| 6,967,579 B1 * | 11/2005 | Elizondo | B64F 1/368 340/572.1 |
| 7,323,996 B2 * | 1/2008 | Mullins | G01S 13/58 340/572.1 |
| 7,345,635 B2 * | 3/2008 | Hohler | G06K 7/10336 340/572.7 |
| 7,425,896 B2 * | 9/2008 | Kawamata | G01R 31/311 235/385 |
| 7,468,670 B2 * | 12/2008 | Liu | B07C 5/3412 235/384 |
| 7,696,882 B1 | 4/2010 | Rahimi et al. | |
| 7,942,323 B2 * | 5/2011 | Brod | G06K 7/0008 235/438 |
| 7,997,486 B2 * | 8/2011 | Ulrich | G06K 7/10346 235/383 |
| 8,093,989 B2 | 1/2012 | Deoalikar et al. | |
| 8,149,094 B2 | 4/2012 | Deoalikar et al. | |
| 8,274,390 B2 | 9/2012 | Blake et al. | |
| 8,384,521 B2 * | 2/2013 | Matsen | G06K 7/0008 340/10.1 |
| 8,496,166 B2 * | 7/2013 | Burns | G06K 5/02 235/375 |
| 8,576,051 B2 | 11/2013 | Hansen | |
| 8,604,981 B2 | 12/2013 | Ehlen | |
| 8,901,205 B2 * | 12/2014 | Yang | H01F 1/113 252/62.54 |
| 9,208,362 B1 | 12/2015 | Fink et al. | |
| 2001/0015380 A1 | 8/2001 | Good et al. | |
| 2002/0070862 A1 | 6/2002 | Francis et al. | |
| 2002/0183882 A1 | 12/2002 | Dearing et al. | |
| 2003/0189490 A1 | 10/2003 | Hogerton et al. | |
| 2004/0032443 A1 | 2/2004 | Moylan et al. | |
| 2004/0113850 A1 | 6/2004 | Olsen | |
| 2004/0153379 A1 | 8/2004 | Joyce et al. | |
| 2004/0196143 A1 | 10/2004 | Crump et al. | |
| 2005/0012613 A1 | 1/2005 | Eckstein et al. | |
| 2005/0068161 A1 | 3/2005 | Ichinose et al. | |
| 2005/0110641 A1 | 5/2005 | Mendolia et al. | |
| 2005/0218219 A1 | 10/2005 | Sano et al. | |
| 2005/0253687 A1 | 11/2005 | Martinez et al. | |
| 2006/0004484 A1 | 1/2006 | Hornbaker et al. | |
| 2006/0043177 A1 | 3/2006 | Nycz et al. | |
| 2006/0043179 A1 | 3/2006 | Nycz et al. | |
| 2006/0071070 A1 | 4/2006 | Maier | |
| 2006/0170556 A1 * | 8/2006 | Fang | G06K 7/10336 340/572.7 |
| 2006/0187041 A1 | 8/2006 | Olsen et al. | |
| 2006/0208072 A1 | 9/2006 | Ku et al. | |
| 2006/0287759 A1 | 12/2006 | Charych | |
| 2007/0013485 A1 | 1/2007 | Edwards et al. | |
| 2007/0030150 A1 | 2/2007 | Mullins | |
| 2007/0080804 A1 | 4/2007 | Hirahara et al. | |
| 2007/0126578 A1 | 6/2007 | Broussard | |
| 2007/0135961 A1 | 6/2007 | Ishida et al. | |
| 2007/0185613 A1 | 8/2007 | Feldenzer | |
| 2007/0254587 A1 | 11/2007 | Schadler et al. | |
| 2007/0279311 A1 | 12/2007 | Kai et al. | |
| 2008/0011836 A1 | 1/2008 | Adema et al. | |
| 2008/0018475 A1 | 1/2008 | Breed et al. | |
| 2008/0061984 A1 | 3/2008 | Breed et al. | |
| 2008/0094179 A1 * | 4/2008 | Domenico | G06K 7/10435 340/10.1 |
| 2008/0122623 A1 | 5/2008 | Hause et al. | |
| 2008/0185540 A1 | 8/2008 | Turner et al. | |
| 2008/0213498 A1 * | 9/2008 | Drzal | B29C 70/025 427/475 |
| 2008/0231431 A1 | 9/2008 | Stawar et al. | |
| 2008/0237339 A1 | 10/2008 | Stawar et al. | |
| 2009/0033493 A1 | 2/2009 | Lin et al. | |
| 2009/0039147 A1 | 2/2009 | Yamamoto et al. | |
| 2009/0079565 A1 | 3/2009 | Mackenzie et al. | |
| 2009/0160646 A1 | 6/2009 | Mackenzie et al. | |
| 2009/0237217 A1 | 9/2009 | Ohkubo et al. | |
| 2010/0217678 A1 | 8/2010 | Goncalves | |
| 2010/0237999 A1 | 9/2010 | Hilgers | |
| 2011/0025569 A1 | 2/2011 | Payne | |
| 2011/0068992 A1 | 3/2011 | Payne | |
| 2011/0095866 A1 | 4/2011 | Karr | |
| 2011/0106681 A1 | 5/2011 | Cockerell | |
| 2012/0019364 A1 * | 1/2012 | Reichenbach | G06K 7/10079 340/10.1 |
| 2012/0075073 A1 * | 3/2012 | Fislage | G06K 7/10435 340/10.1 |
| 2012/0075074 A1 | 3/2012 | Frosch et al. | |
| 2012/0149300 A1 | 6/2012 | Forster | |
| 2012/0161937 A1 | 6/2012 | Chen | |
| 2012/0256732 A1 | 10/2012 | McAllister | |
| 2013/0141222 A1 | 6/2013 | Garcia | |
| 2013/0342322 A1 | 12/2013 | Hinman et al. | |
| 2014/0158766 A1 * | 6/2014 | Paske | G06K 7/10316 235/440 |
| 2014/0292499 A1 | 10/2014 | Zhang et al. | |
| 2015/0029001 A1 | 1/2015 | Pleshek et al. | |
| 2015/0127362 A1 | 5/2015 | DeBusk et al. | |
| 2015/0136849 A1 * | 5/2015 | Bremer | G06K 7/0008 235/437 |
| 2016/0117530 A1 | 4/2016 | Roth | |
| 2016/0117534 A1 | 4/2016 | Roth | |

FOREIGN PATENT DOCUMENTS

| | | |
|---|---|---|
| CN | 202193383 | 4/2012 |
| WO | 2000005674 | 2/2000 |
| WO | WO 0005674 A2 * | 2/2000 |
| WO | 2007104339 | 9/2007 |
| WO | 2009002156 | 12/2008 |

* cited by examiner

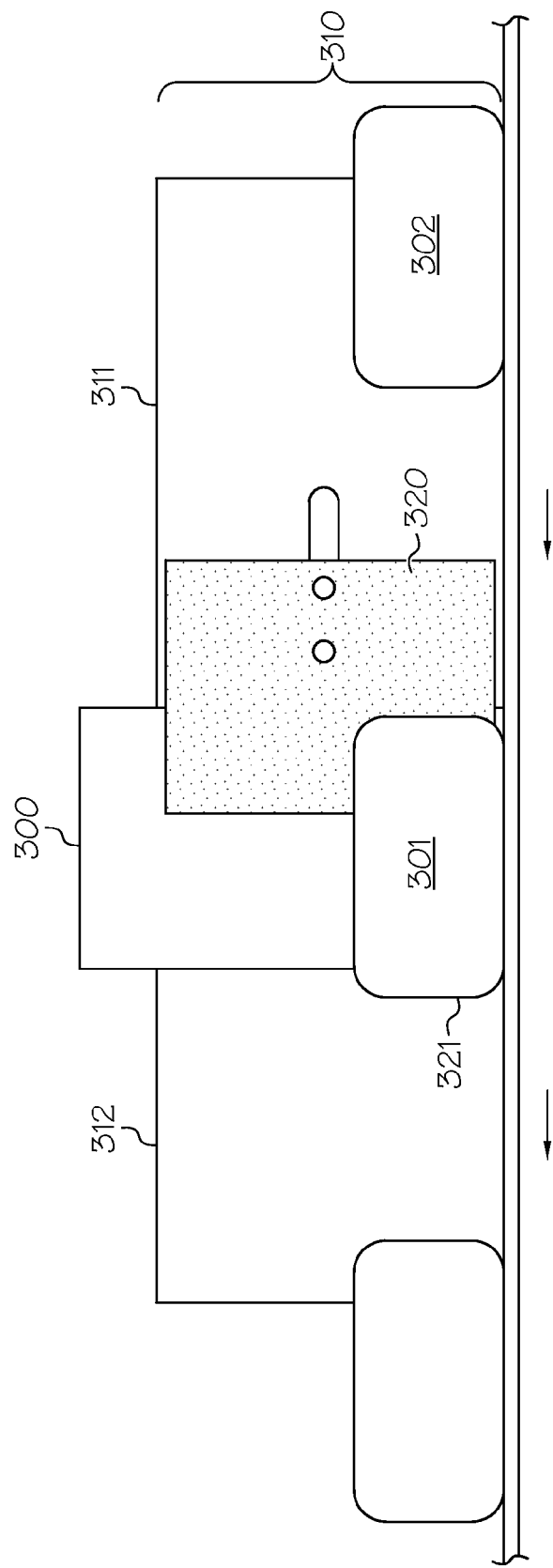

RFID VARIABLE APERTURE READ CHAMBER CROSSFIRE

BACKGROUND

The present invention relates generally to radio frequency identification (RFID) systems and devices. More particularly, the present disclosure relates to systems and devices for further confining and focusing radio frequency energy when applied with the use of RFID transponders that are moving in high speed linear motion through use of a conveyance to allow for the singulation of carton contents.

Radio frequency identification (RFID) tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine an identification and characteristics of an item.

Currently, the need for the ability to scan RFID transponders in automated environments has caused the creation of a scanning tunnel or enclosure. Different manufacturers may take different approaches to scanning these transponders. Typically, an enclosure uses a combination of absorber material to attenuate radio frequency energy and a read chamber central to the enclosure that projects a read zone. Thus, the read chamber uses an absorber method that directs the main flow of energy normal to the antenna plane, creating the read zone. However, although this does create a field or read zone, it does not allow for tuning of the read zone. Refinement (or tuning) of the leading edge signal of the read zone is critical to the success of reducing the overall gap or spacing required between cartons. Further, some degree of tuning can be done by means of power modulation to the antenna contained within the read chamber. However, this is only marginally effective as a function of the power decreases so does the effectiveness of the reader to energize the transponders.

The present invention discloses a read chamber device that provides for tuning (or reducing) the read zone via a movable metal plate that is positioned at variable distances to partially or fully cover the read zone. The metal plate is moved into the read zone to obstruct a percentage of radio frequency energy from escaping the read zone, and thus narrowing the total read field and refining the leading edge signal of the read zone. Further, the disclosed read chamber device does not require power modulation for tuning and allows the use of high reader power without causing an extension of the RF field beyond a defined area. Thus, the read chamber device, in combination with the use of metallic and absorption materials allows for the singulation of carton contents.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a read chamber device for use within a radio frequency identification (RFID) scanning enclosure (or tunnel) which provides a means of reading a plurality of cartons moving through the enclosure via a conveyor belt. The RFID scanning enclosure is positioned over a section of the conveyor belt, such that the plurality of cartons on the conveyor belt pass directly through the RFID scanning enclosure. The read chamber device is positioned within the enclosure and projects a read zone via an antenna positioned centrally within the read chamber device.

Energy projected straight forward from the front plane of the antenna is carried forward without obstruction creating the read zone. Additionally, absorber material components are secured on either side of the antenna and on the side walls of the read chamber device. Thus, energy projected (or leaked) to the sides of the front plane of the antenna is canceled through the use of the absorber material components to create a fixed read zone. Once the plurality of cartons enters the read zone the RFID tags (or transponders) on the cartons are energized and read in the read zone by the reader and signals are transmitted back to the reader, identifying the carton and transmitting any other information the tags might contain.

In a preferred embodiment, the read chamber device provides for tuning (or reducing) the read zone via a movable metal plate that is positioned at variable distances to partially or fully cover the read zone. The metal plate is moved into the read zone to obstruct a percentage of radio frequency energy from escaping the read zone, and thus narrowing the total read field. The metal plate comprises absorber material components secured to its surface to cancel a portion of the signal and prevent it from propagating back to the face of the antenna which emits the radio frequency signal. Thus, the variability of the metal plate allows for tuning of the intended read zone along the line of conveyance which allows for isolation of groups of transponders from one carton to the next.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3 illustrates a method of moving containers through a read chamber device and RFID scanning enclosure in accordance with the disclosed architecture.

DETAILED DESCRIPTION

Figure 1:
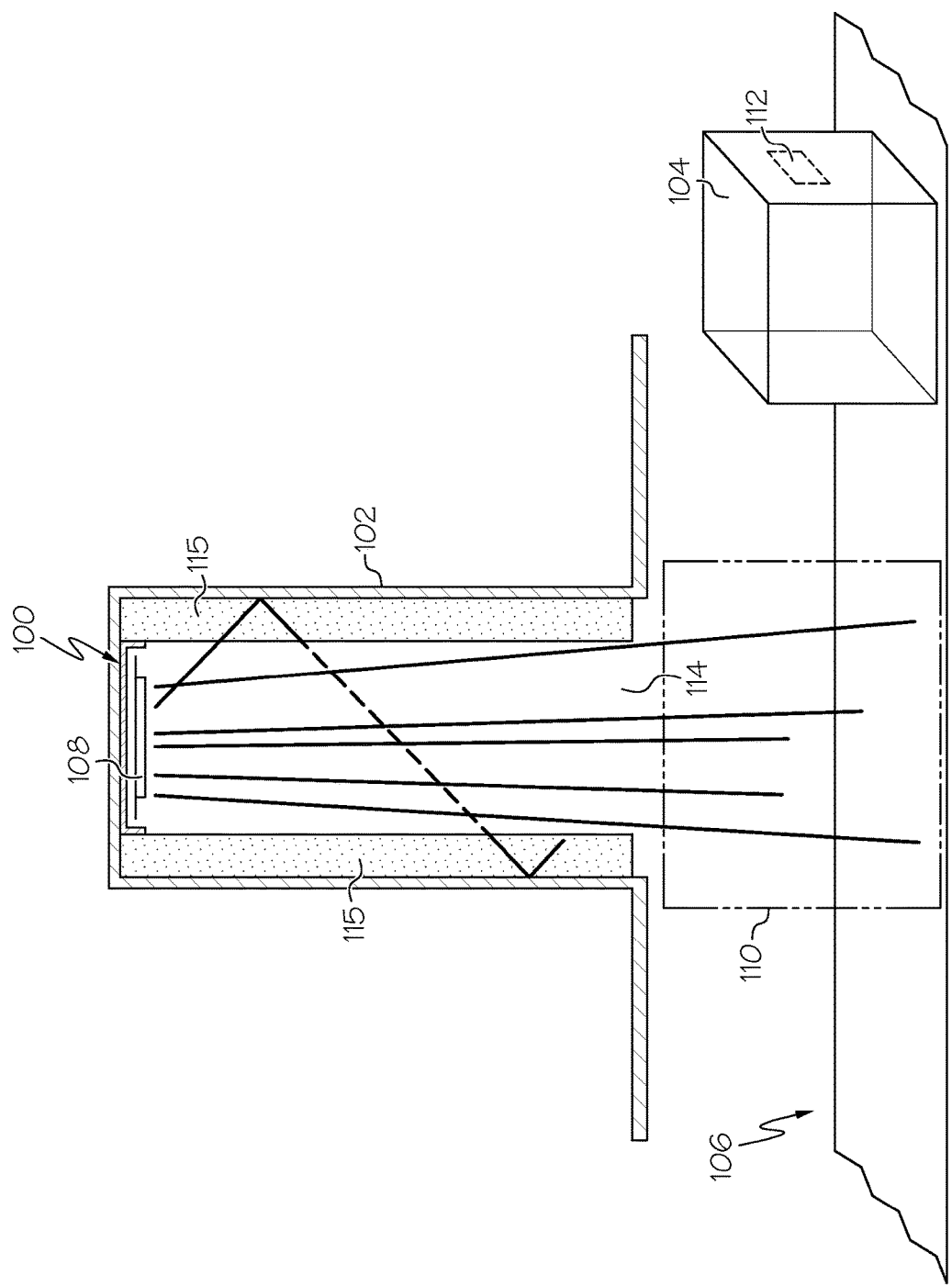
FIG. 1 illustrates a top view of the read chamber device and RFID scanning enclosure in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a read chamber device that provides for tuning (or reducing) the read zone via a movable metal plate that is positioned at variable distances to partially or fully cover the read zone. The metal plate is moved into the read zone to obstruct a percentage of radio frequency energy from escaping the read zone, and thus narrowing the total read field and refining the leading edge signal of the read zone. Further, the read chamber device does not require power modulation for tuning and allows the use of high reader power without causing an extension of the RF field beyond a defined area. Thus, the read chamber device, in combination with the use of metallic and absorption materials allows for the singulation of carton contents. The present invention contemplates that the size of the RF field of the present invention is variable and is not limited to the reading of a singular carton but may be extended to a plurality of cartons if so desired.

The read chamber device is disclosed for use within a radio frequency identification (RFID) scanning enclosure. The enclosure is positioned over a section of the conveyor belt, such that the plurality of cartons on the conveyor belt pass directly through the enclosure. The read chamber device may be positioned centrally to the enclosure and projects a read zone via an antenna positioned centrally within the read chamber device. The read chamber device provides for tuning the read zone via a movable metal plate comprising absorber material components secured to it that is positioned at variable distances to partially or fully cover the read zone. The metal plate is moved into the read zone to obstruct a percentage of radio frequency energy from escaping the read zone, and thus narrowing the total read field.

Referring initially to the drawings, FIG. 1 illustrates a read chamber device 100 for use within a radio frequency identification (RFID) scanning enclosure (or tunnel) 102 which provides a means of reading a plurality of cartons 104 moving through the enclosure 102. Typically the plurality of cartons 104 move through the enclosure 102 via a conveyor belt 106 or other transport mechanism as is known in the art. The RFID scanning enclosure 102 is positioned over a section of the conveyor belt 106, such that the plurality of cartons 104 on the conveyor belt 106 pass directly through the RFID scanning enclosure 102. In one embodiment, a barcode scanner is located within the RFID scanning enclosure 102.

Once the plurality of cartons 104 enters the enclosure 102 via conveyor belt 106, an antenna 108 projects radio frequency energy to create a read zone 110 for the reader. RFID tags 112 (or transponders) on the cartons 104 are energized and read in the read zone 110 by the reader and signals are transmitted back to the reader, identifying the carton 104 and transmitting any other information the tags 112 might contain. One of ordinary skill in the art will appreciate that using the enclosure 102 to read RFID tags 112 on cartons 104 is merely one possible example and the same system may be used for any application that involves a reading of any group of items that are streaming through a particular location. Thus, although the term "carton" is used throughout the present disclosure for exemplary purposes, the term "carton" may be any single item or a group of items.

Figure 2:
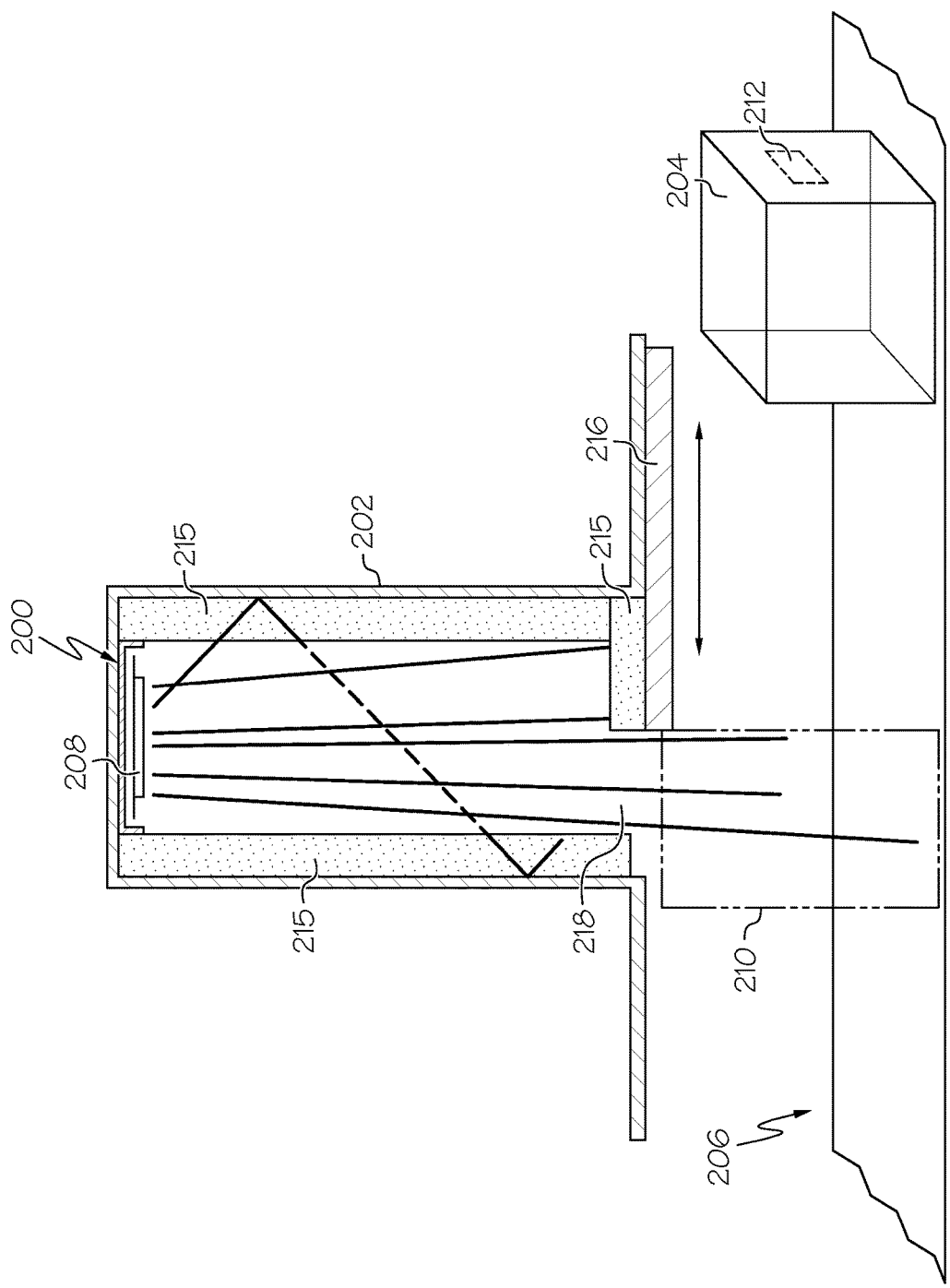
FIG. 2 illustrates a top view of the read chamber device with moveable metal plates for tuning the read zone in accordance with the disclosed architecture.

The RFID scanning enclosure 102 can be any suitable size, shape, and configuration as is known in the art without affecting the overall concept of the invention. One of ordinary skill in the art will appreciate that the interior and/or exterior shape of the enclosure 102 as shown in FIGS. 1 and 2 is for illustrative purposes only and many other shapes of the enclosure 102, such as a cylinder or a rectangle, are well within the, scope of the present disclosure. Although dimensions of the enclosure 102 (i.e., length, width, and height) are important design parameters for good performance, the enclosure 102 may be any shape that ensures an optimal read zone 110 toward a carton 104 within the enclosure 102.

Further, the RFID scanning enclosure 102 comprises a tunnel throat (or opening) 114 wherein cartons 104 enter the enclosure 102 via the conveyor belt 106. The tunnel opening 114 is designed to deal with motility and movement of the conveyor belt 106 the products or cartons 104 are traveling on. For example, the tunnel opening can have a throat capacity of approximately 24" or 36".

Furthermore, the scanning enclosure 102 comprises a read chamber device 100. The read chamber device 100 is positioned centrally to the enclosure 102 and projects a read zone 110 via at least one antenna 108. Specifically, an antenna 108 is positioned centrally within the read chamber device 100 and projects radio frequency energy from a front plane of the antenna 108. Any suitable number of antennas 108 can be used as is known in the art, depending on the wants and needs of a user and the configuration of the enclosure 102. Further, any suitable type of antenna can be used as is known in the art, such as a wide angle antenna, wide angle antenna, circular, linear, dipole, etc., depending on the wants and needs of a user and the configuration of the enclosure 102. Energy projected straight forward from the front plane of the antenna(s) 108 is carried forward without obstruction creating the read zone 110.

Additionally, absorber material components 115 are secured on either side of the antenna 108 and on the side walls of the read chamber device 100. The absorber material components 115 typically comprise absorber material components 115 typically comprise some kind of graphite impregnated material or other absorption technique for subduing the propogation of RF energy, though any other suitable material can be used as is known in the art. The absorber material components 115 are typically secured to the sides and side walls of the read chamber device 100 via any suitable securing means as is known in the art. Thus, energy projected (or leaked) to the sides of the front plane of the antenna 108 is canceled through the use of the absorber material components 115 to create a fixed read zone 110 (defined or fixed width for the read zone). Accordingly, cartons 104 (and their transponders or tags 112) entering the fixed read zone 110 are detected and read by the reader and information contained within the tags 112 is transmitted to the reader.

FIG. 2 illustrates a read chamber device 200 for use within a radio frequency identification (RFID) scanning enclosure (or tunnel) 202 which provides a means of reading a plurality of cartons 204 moving through the enclosure 202 and allows for tuning (or reducing) the read zone 210. As stated supra, the plurality of cartons 204 move through the enclosure 202 via a conveyor belt 206 or other transport mechanism as is known in the art. The RFID scanning enclosure 202 is positioned over a section of the conveyor belt 206, such that the plurality of cartons 204 on the conveyor belt 206 pass directly through the RFID scanning enclosure 202.

Once the plurality of cartons 204 enters the enclosure 202 via conveyor belt 206, an antenna 208 projects radio frequency energy to create a read zone 210 for the reader. RFID tags 212 (or transponders) on the cartons 204 are energized and read in the read zone 210 by the reader and signals are transmitted back to the reader, identifying the carton 204 and transmitting any other information the tags 212 might contain.

Further, the RFID scanning enclosure 202 comprises a tunnel throat (or opening) 214 wherein cartons 204 enter the enclosure 202 via the conveyor belt 206. The tunnel opening 214 is designed to deal with motility and movement of the conveyor belt 206 the products or cartons 204 are traveling on. For example, the tunnel opening can have a throat capacity of approximately 24" or 36".

Furthermore, the scanning enclosure 202 comprises a read chamber device 200. The read chamber device 200 is positioned centrally to the enclosure 202 and projects a read zone 210 via at least one antenna 208. Specifically, an antenna 208 is positioned centrally within the read chamber device 200 and projects radio frequency energy from a front plane of the antenna 208. Any suitable number of antennas 208 can be used as is known in the art, depending on the wants and needs of a user and the configuration of the enclosure 202. Further, any suitable type of antenna can be used as is known in the art, such as a wide angle antenna, wide angle antenna, circular, linear, dipole etc., depending on the wants and needs of a user and the configuration of the enclosure 202. Energy projected straight forward from the front plane of the antenna(s) 208 is carried forward without obstruction creating the read zone 210.

Additionally, absorber material components 215 are secured on either side of the antenna 208 and on the side walls of the read chamber device 200. The absorber material components 215 typically comprise absorber material components 115 typically comprise some kind of graphite impregnated material or other absorption technique for subduing the propogation of RF energy, though any other suitable material can be used as is known in the art. The absorber material components 215 are typically secured to the sides and side walls of the read chamber device 200 via any suitable securing means as is known in the art. Thus, energy projected (or leaked) to the sides of the front plane of the antenna 208 is canceled through the use of the absorber material components 215 to create a fixed read zone 210 (defined or fixed width for the read zone). Accordingly, cartons 204 (and their transponders or tags 212) entering the fixed read zone 210 are detected and read by the reader and information contained within the tags 212 is transmitted to the reader.

The read chamber device 200 of FIG. 2 provides for tuning (or reducing) the read zone 210. Specifically, the read chamber device 200 creates refinement in the leading edge of the read zone 210 where first detection of transponders is most critical. This leading edge is what defines the minimum carton spacing required to achieve isolation of the transponders. By design, the transponders (or RFID inlays) in the cartons 204 that are used are forced into stasis once read by the reader, such that those transponders will no longer be seen by the reader until they have exited the entire enclosure 202.

Some degree of tuning can take place by means of power modulation to the antenna(s) 208 contained within the read chamber device 200. However, this is only marginally effective because as a function of the power decreases, so does the effectiveness of the reader to energize the transponders.

The read chamber device 200 shown in FIG. 2 creates refinement in the leading edge of the read zone 210. Specifically, the read chamber device 200 further comprises at least one movable plate 216 positioned at an end 218 of the read chamber device 200 directly across from the antenna 208. The plate 216 is movably secured to the read chamber device 200 via any suitable securing means as is known in the art, such as a guide pin, know that allow adjustment from outside the chamber. The plate 216, in one embodiment, is designed to run along a wall of the read chamber device 200 such that the device 200 has a slot for via a securing means. Further, the plate 216 is typically made of metal or any other suitable material as is known in the art. The plate 216 is positioned at variable distances to partially cover the read zone 210, and can even be positioned to fully cover the read zone 210, depending on the needs and wants of a user. The plate 216 is moved into the read field (zone) 210 to obstruct a percentage of radio frequency energy from escaping the read zone 210, and thus narrowing the total read field 210.

Furthermore, the metal plate 216 comprises absorber material components 215 secured to a surface of the metal plate 216 or completely covering the metal plate 216. The absorber material components 215 typically comprise absorber material components 115 typically comprise some kind of graphite impregnated material or other absorption technique for subduing the propogation of RF energy, though any other suitable material can be used as is known in the art. The absorber material components 215 are typically secured to the metal plate 216 via any suitable securing means as is known in the art. The absorber material components 215 cancel the portion of the signal and prevent it from propagating back to the face of the antenna 208 which emits the radio frequency signal. With the high angle of incidence (perpendicular) of the signal to the absorber material components 215, the highest level of cancellation is possible. Thus, the variability of the metal plate 216 allows for tuning of the intended read zone 210 along the line of conveyance which allows for isolation of groups of transponders from one carton 204 to the next. Accordingly, the plurality of conveyance capacities allows the read chamber device 200 to work in a large array of tunnel widths and heights, as the read area can be refined for best performance. For example, given the area or volume of the tunnel (or enclosure) entrance and exits, the read area expands/contracts to accommodate this change in overall required read volume.

FIG. 3 illustrates a number of containers such as cartons (i.e. packages, boxes) moving through the RFID scanning enclosure 310 and specifically through the read zone projected by the read chamber 300. First, the carton 3 (302) enters the entrance tunnel 311 while carton 2 (301) moves through the read zone 320 projected by the read chamber 330. In one embodiment, the read chamber 300 has an antenna that is triggered by a photo eye such that the photo eye is triggered by a leading edge 321 of a carton as it passes by the photo eye triggering the antenna to read the RFID of the container and only that container.

The antenna in the read chamber 300 may be configured so as to read the RFID device only a singular container by configuring the reader of the read chamber 300 to only function in a short burst and then turn off before a next container passes through the read zone 320 projected by the read chamber 300. It is contemplated that the read chamber 300 may function for varying lengths of time and is not limited to reading the contents of a singular container.

In one embodiment, an additional antenna may be placed downstream from the RFID scanning enclosure. This allows for the RFID tag of a container to receive a signal telling it to "sleep" after already being read by the RFID scanning enclosure upstream.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A read chamber device for use within a radio frequency identification (RFID) scanning enclosure for providing a means of reading a plurality of cartons moving through the enclosure, comprising:
   at least one antenna positioned within the read chamber device;
   wherein the at least one antenna projects radio frequency energy from a front plane of the at least one antenna; and
   a plurality of absorber material components positioned on either side of the at least one antenna;
   at least one movable plate positioned at an end of the read chamber opposite the at least one antenna; and
   wherein radio frequency energy projected to sides of the front plane of the at least one antenna is canceled through use of the plurality of absorber material components to create a read zone; and
   wherein the read zone is adjustable in area by re-positioning the at least one movable plate to at least partially cover the read zone.

2. The read chamber device of claim 1, wherein the at least one antenna is a wide angle antenna.

3. The read chamber device of claim 1, wherein the plurality of cartons are moving through the enclosure via a conveyor belt.

4. The read chamber device of claim 1, wherein the at least one movable plate is positioned to fully cover the read zone.

5. The read chamber device of claim 4, wherein the at least one movable plate is manufactured of RF reflective material.

6. The read chamber device of claim 5, wherein the at least one movable plate further comprises absorber material components secured to a surface, such that when the at least one movable plate is moved into the read zone, the at least one movable plate cancels a portion of the radio frequency energy from propagating back to the at least one antenna and narrows the read zone.

7. An RFID scanning enclosure for providing a means of reading a plurality of cartons moving through the enclosure, comprising:
   a conveyor belt for moving the plurality of cartons through the enclosure; and
   a read chamber device positioned within the enclosure and comprising at least one antenna that is a wide angle antenna and a plurality of absorber material components; and
   at least one movable plate positioned at an end of the read chamber device opposite the at least one antenna; and
   wherein the at least one antenna is positioned centrally within the read chamber device and the plurality of absorber material components are positioned on either side of the at least one antenna; and
   wherein the at least one antenna projects radio frequency energy from a front plane of the at least one antenna; and
   wherein radio frequency energy projected to sides of the front plane of the at least one antenna is canceled through use of the plurality of absorber material components to create a read zone; and
   wherein the read zone is adjustable in area by re-positioning the at least one movable plate to at least partially cover the read zone to refine a leading edge signal of the read zone.

8. The RFID scanning enclosure of claim 7, wherein the at least one movable plate is positioned to fully cover the read zone.

9. The RFID scanning enclosure of claim 7, wherein the least one movable plate further comprises absorber material components secured to a surface, such that when the at least one movable plate is moved into the read zone, the at least one movable plate cancels a portion of the radio frequency energy from propagating back to the at least one antenna and narrows the read zone.

10. The RFID scanning enclosure of claim 7, wherein the at least one movable plate is manufactured of metal.

11. The RFID scanning enclosure of claim 7, wherein the read zone is positioned over an entire width of a conveyor belt.

12. A read chamber device for use within an RFID scanning enclosure for providing a means of reading a plurality of cartons moving through the enclosure, comprising:
   at least one antenna positioned within the read chamber device;
   wherein the at least one antenna projects radio frequency energy from a front plane of the at least one antenna;
   a plurality of absorber material components positioned on either side of the at least one antenna such that the absorber material comprises graphite impregnated material;
   wherein radio frequency energy projected to sides of the front plane of the at least one antenna is canceled through use of the plurality of absorber material components to create a read zone; and
   at least one movable plate positioned at an end of the read chamber opposite of the at least one antenna; and
   wherein the at least one movable plate is positioned at variable distances to partially cover the read zone refining a leading edge signal of the read zone.

13. The read chamber device of claim 12, wherein the least one movable plate further comprises absorber material components secured to a surface, such that when the at least one movable plate is moved into the read zone, the at least one movable plate cancels a portion of the radio frequency energy from propagating back to the at least one antenna and narrows the read zone.

14. The read chamber device of claim 12, wherein the at least one antenna is a wide angle antenna.

15. A method of utilizing a read chamber device within a RFID scanning enclosure comprising the following steps:
   providing a scanning enclosure wherein the enclosure has at least one antenna positioned within the read chamber device;

providing a plurality of absorber material components positioned on either side of the at least one antenna;

providing at least two containers such that each container has at least one RFID device attached thereon;

placing the at least two containers on a conveyer belt;

refining a leading edge signal of a read zone to allow for singulation of each container;

moving one of the at least two containers through the scanning enclosure and through the read zone provided by the read chamber; and reading the RFID device of the container that is moved through the scanning enclosure with the antenna.

* * * * *